J. Reed.
Steering.
Nº 22,453.
Patented Dec. 28, 1858.
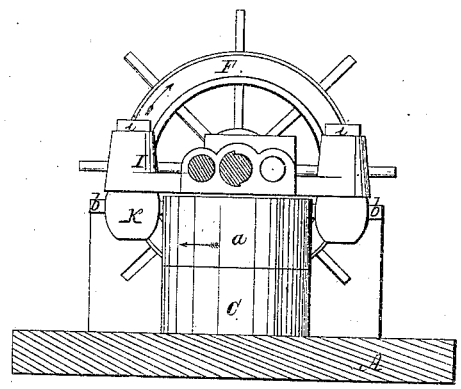
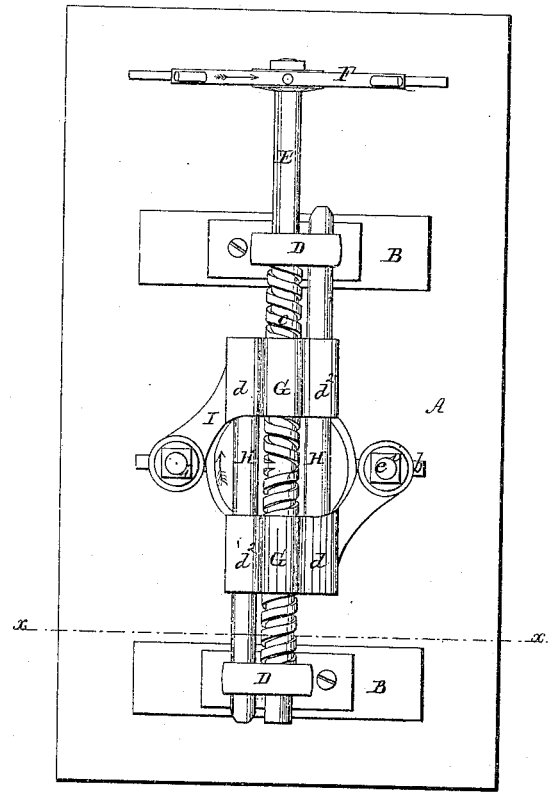
Witnesses:
Thos Reach
Chas H. Glova
Inventor:
Jesse Reed.

UNITED STATES PATENT OFFICE.

JESSE REED, OF MARSHFIELD, MASSACHUSETTS.

STEERING APPARATUS.

Specification of Letters Patent No. 22,453, dated December 28, 1858.

*To all whom it may concern:*

Be it known that I, JESSE REED, of Marshfield, in the county of Plymouth and State of Massachusetts, have invented a new and Improved Steering Apparatus for Vessels, of which the following is a full, clear, and exact description, reference being had to the accompanying drawings, making part of this specification, in which—

Figure 1 is a plan; Fig. 2, a transverse vertical section on the line $x$, $x$ of Fig. 1.

That others skilled in the art may understand and use my invention I will proceed to describe the manner in which I have carried out the same.

In the said drawings A, represents the deck of the vessel from which rise two stout stanchions B, which support the steeering apparatus.

C, is the rudder head to the top of which is secured a heavy metal band $a$, projecting from two opposite sides of which are the rods or bars $b$, by which the rudder is turned in a manner to be presently explained. The bars $b$, may be in one piece and extend entirely across the rudder head, being let down into the top of it.

A block D on the top of each stanchion B, serves as a bearing for a screw shaft E, to one end of which is attached the hand or steering wheel F; the screw on this shaft is duplex, the thread $c$, starting from the middle of the length of the shaft between the two bearings D, and winding around the shaft toward one end to the right and toward the other end to the left hand. Two nuts G, are carried on the screw shaft E. As they are similar I will describe but one of them; on each side of the nut and forming part thereof is cast a lug $d$, $d^2$. To one of these $d$, is secured the end of a stout guide rod H, which lies parallel to the shaft E, and passes through the lug $d^2$ of the other nut and enters a hole in the block D, alongside of the bearing of the shaft E. As the shaft E is revolved in one direction or the other the nuts G approach or recede from each other, the guide rods H, sliding in the lugs $d^2$, and for part of the time also in the bearings D. To the lug $d$, of each nut is attached an arm I, in the outer end of which revolves a vertical spindle $e$, secured by a nut $i$. This spindle carries at its lower end a bulb K, through a hole in which passes the rod $b$, the bulb sliding in and out on the rod as the rudder head is revolved.

Operation: As the wheel F is turned in the direction of its arrow the nuts G' recede from each other, the rods H, being drawn through the lugs $d^2$ until the nuts are hard up against the blocks D when the ends of the guide rods will be drawn out of the bearings D, or if found convenient these rods may be made of such a length that their ends will remain in the bearings D, which will make them still more firm and unyielding to any lateral strain.

The tendency to twist and wear, which is given to the nuts G, by the side draft of the arms I, is counteracted by the guide rods H, the leverage of the rods to resist this torsion increasing as the nuts recede from each other, so that before the ends of the rods have drawn out from the bearings D, the bearing of each rod in its opposite lug $d^2$ is sufficient to prevent any twist of the nuts. In practice this twisting of the nuts on the screws in most steering apparatus, as they become worn has been found to be very detrimental, producing concussion and back lash as it is termed. To obviate this difficulty several arrangements of guide bars and slides have been contrived, but none I believe so simple and efficient as that above described.

What I claim as my invention and desire to secure by Letters Patent is—

1. The duplex screw shaft E, in combination with the nuts G, and guide rods H, the rods being each permanently connected with one of the nuts and passed through the lug $d^2$ on the other nut and operating in the manner substantially as specified.

2. I claim in combination with the above connecting the nut G to the rudder head by means of the arm I, bulb K, and rod $b$, operating substantially as described.

JESSE REED.

Witnesses:
JOHN FORD,
WELTHEA L. FORD.